United States Patent
Larsonneur

[11] 3,888,085
[45] June 10, 1975

[54] PYROTECHNICAL JACKS

[75] Inventor: Jean-Francois Larsonneur, Billancourt, France

[73] Assignees: Regie Nationale des Usines Renault, Billancourt; Automobiles Peugeot, Paris, both of France

[22] Filed: Oct. 30, 1973

[21] Appl. No.: 411,154

[30] Foreign Application Priority Data
Nov. 6, 1972 France .................. 72.39188

[52] U.S. Cl. ............... 60/635; 60/638; 92/65; 92/161; 244/122 R
[51] Int. Cl. ............... F01b 29/08; F02n 13/00
[58] Field of Search ......... 60/632, 635, 638; 92/65, 92/146, 161; 244/122 B, 122 AG, 122 R

[56] References Cited
UNITED STATES PATENTS
2,815,008  12/1957  Hirt .................... 60/638
3,168,014  2/1965   Aslan .................. 92/161

FOREIGN PATENTS OR APPLICATIONS
164,836  9/1958  Sweden ................ 244/122 B Primary Examiner—Wendell E. Burns
Attorney, Agent, or Firm—Stevens, Davis, Miller & Mosher

[57] ABSTRACT

This pyrotechnical jack intended notably for stretching the webbing of a safety belt or harness in a motor vehicle, which is of the type comprising a cylinder, a piston movable in said cylinder, a traction rod rigid with said piston, an explosive charge, an explosion chamber, means for locking said piston at the end of its operative stroke, and means for anchoring said jack, has its cylinder closed adjacent its anchorage end by a hollow head of which the inner wall is adapted to co-act with said piston locking means in order to retain said piston in its foremost position, said head further comprising means for anchoring the jack.

1 Claim, 2 Drawing Figures

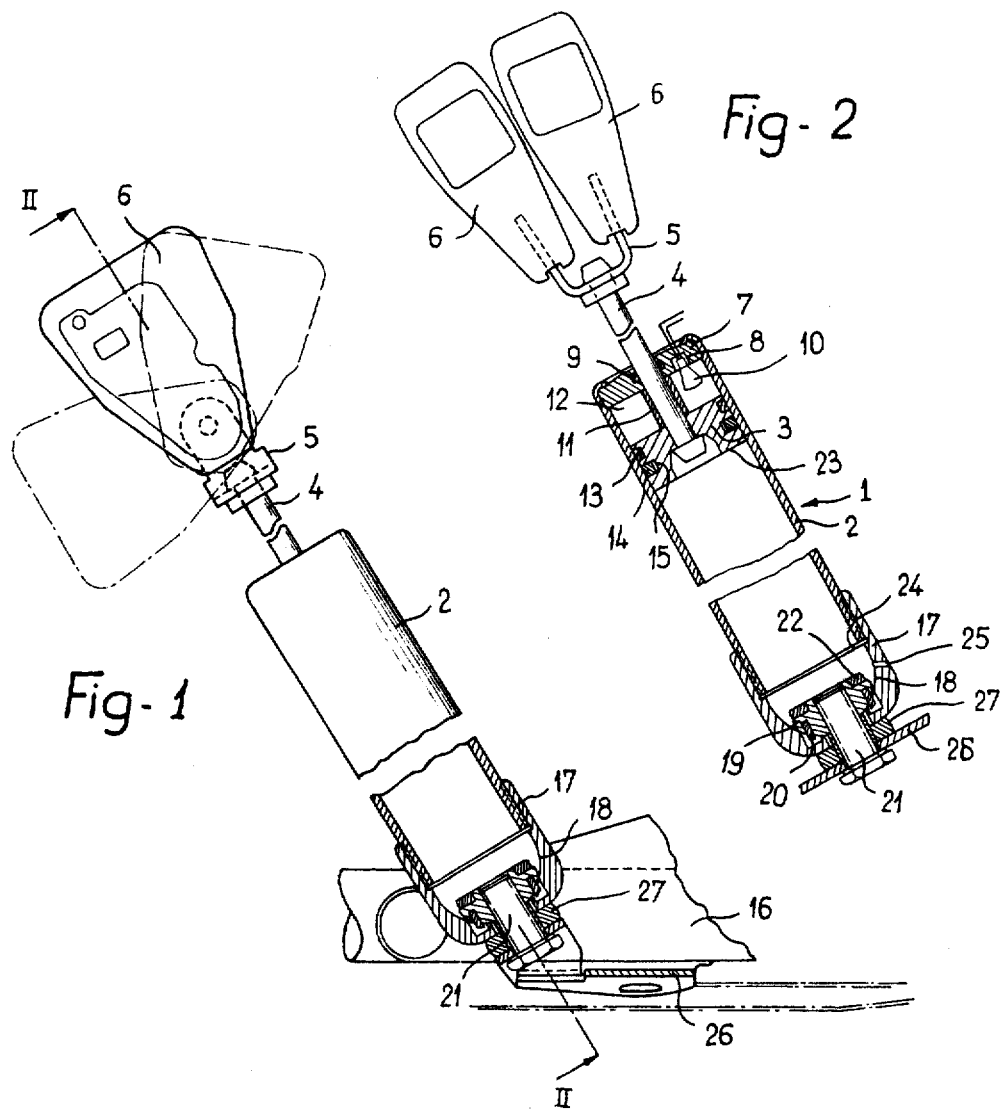

PYROTECHNICAL JACKS

This invention is directed to pyrotechnical jacks and more particularly to pyrotechnical jacks or rams of the type intended for stretching the webbing of a safety belt or harness equipping automotive vehicles.

A typical application of jacks of this character is disclosed in the French Pat. No. 72/12466 filed on Apr. 10, 1972, and the present invention relates to a specific embodiment of this jack.

It is known that these jacks comprise as a rule a cylinder, a powder charge, an explosion chamber, a piston rigid with a traction rod, means for locking the piston at the end of its stroke and other means for securing the cylinder to a part or portion rigid with the structure of the vehicle.

This invention is concerned more particularly with an improvement consisting in closing the cylinder end to be secured to the vehicle by means of a member incorporating both the means for locking the piston at the end of its stroke and the means for securing or anchoring the jack proper. To this end, this closing member has substantially the shape of a hollow head or cap provided with means for anchoring the cylinder, and its inner wall is adapted to co-act with the means provided for locking the piston at the end of its stroke.

According to a specific embodiment of the closing member the jack is swivel-mounted and its bottom constitutes a socket for a ball-joint.

Other features and advantages of the invention will appear as the following description proceeds with reference to the attached drawing, in which:

FIG. 1 is a fragmentary longitudinal axial section of the jack, showing the manner in which it is anchored to the body structure of a vehicle, and FIG. 2 is a section taken along the line II-II of FIG. 1.

Referring to the drawing, it will be seen that the jack designated in general by the reference numeral 1 comprises a cylinder body 2, a piston 3 slidably fitted in said cylinder 2, a traction rod 4 consisting for example of a steel wire rigid with the piston and provided at its free end with a yoke 5 supporting the cases 6 for receiving the loop of a safety harness (not shown).

The head of the jack, which is crimped in the cylinder body 2, comprises the passage orifice for the sealed ignition wires leading to the explosive charge 10 and also seals and gaskets such as 9. A tubular distance-piece 11 slipped on the traction wire or rod 4 permits of calibrating the volume of the explosion chamber 12 of jack 1.

On the other hand, the piston 3 is provided with an O-ring 13 and a locking ring 14 constituting the means for locking the piston at the end of its stroke, as will be explained presently.

This locking ring 14 consists essentially of an expansible split ring engaging an annular groove 15 formed in said piston, the resilient engagement between this split ring and the cylinder bore 2 preventing any premature movement of the piston 3.

Of course, this function could also be devolved to a thin tube adapted to undergo a plastic deformation by compression, this tube being disposed between the bottom of the cylinder and the inoperative face of piston 3.

The jack 1 further comprises means for anchoring the body 2 to the element 16 of the vehicle body.

To this end, the jack is closed by a hollow head or cap 17 screwed to the cylinder 2 and having a semi-spherical bottom constituting a socket for receiving the ball joint 19 centered by means of studs 20.

The joint ball 19 is rigid with fastening means consisting of screws 21 and comprises a leaden shock-absorbing member 22 adapted to co-act with the inoperative face 23 of piston 3 at the end of the operative stroke of this piston.

The means for locking the piston at the end of its stroke comprises the aforesaid split ring 14 which in its expanded condition is adapted to co-act with a shoulder 24 provided at the lower base of cylinder 2 and projecting from the inner wall of said hollow head 17.

From the foregoing, it is clear that the mode of operation of the jack comprises stopping of the piston 3 at the end of its stroke by means of the locking ring 14 which co-acts jointly with the aforesaid shoulder 24 and with the groove 15 constituting the ring cavity.

To facilitate the exhaust of any air compressed in one of the chambers of jack 1, one or more holes 25 may be drilled through the bottom walls of the device, as shown in FIG. 2.

Finally, it will be seen that the jack 1 is rigid with an anchoring fitting 26 with the interposition of a resilient pad 27 for damping out the vibration transmitted from the frame of the vehicle and likely to interfere with the proper operation of the jack.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. A pyrotechnical jack for stretching the webbing of a safety belt or harness in a motor vehicle with one end of the jack being adapted to be anchored to an element of a motor vehicle, said jack comprising:
    a cylinder,
    a piston slidably fitted in said cylinder,
    a hollow head connected to one end of said cylinder,
    a traction rod rigidly connected to said piston,
    an explosive charge,
    an explosion chamber,
    means defining a peripheral groove in said piston,
    means for locking the piston at the end of its operative stroke, said locking means comprising:
    an expansible split ring in said groove, and
    a shoulder formed by the end of said cylinder projecting from the inner wall of said hollow head, said shoulder being adapted to retain the piston at the end of its operative stroke by the expansion of the then expanded split ring thereover,
    means defining a part-spherical socket in the inner surface of the end of said hollow head most remote from said cylinder,
    a ball joint positioned in said socket for the swivel mounting of the jack, said ball joint comprising a shock absorbing element adapted to co-act with the inoperative face of the piston at the end of the operative stroke thereof, and
    an element rigidly connected to said ball joint for anchoring the jack to an element of a motor vehicle.

* * * * *